US008330816B2

(12) United States Patent
Imamura

(10) Patent No.: US 8,330,816 B2
(45) Date of Patent: Dec. 11, 2012

(54) IMAGE PROCESSING DEVICE

(75) Inventor: Kosuke Imamura, Iwaki (JP)

(73) Assignee: Alpine Electronics, Inc. (JP)

( * ) Notice: Subject to any disclaimer, the term of this patent is extended or adjusted under 35 U.S.C. 154(b) by 1391 days.

(21) Appl. No.: 11/942,386

(22) Filed: Nov. 19, 2007

(65) Prior Publication Data

US 2008/0198226 A1 Aug. 21, 2008

(30) Foreign Application Priority Data

Feb. 21, 2007 (JP) ................................ 2007-040765

(51) Int. Cl.
H04N 7/18 (2006.01)
(52) U.S. Cl. .......................... 348/148; 348/143; 396/153
(58) Field of Classification Search .................. 348/148, 348/E07.085; 382/103; 396/153
See application file for complete search history.

(56) References Cited

U.S. PATENT DOCUMENTS

| 6,421,081 | B1 * | 7/2002 | Markus .......................... 348/148 |
| 7,161,616 | B1 | 1/2007 | Okamoto et al. |
| 7,646,311 | B2 * | 1/2010 | Afzulpurkar et al. ......... 340/934 |
| 7,834,910 | B2 * | 11/2010 | DeLorme et al. .......... 348/218.1 |
| 7,840,048 | B2 * | 11/2010 | Ramsay et al. ............... 382/128 |
| 7,916,172 | B2 * | 3/2011 | Kagei ........................... 348/169 |
| 2002/0001399 | A1 * | 1/2002 | Yoshida et al. ............... 382/104 |
| 2002/0080017 | A1 * | 6/2002 | Kumata et al. ................ 340/436 |
| 2004/0169734 | A1 * | 9/2004 | Umeyama .................. 348/218.1 |
| 2005/0102070 | A1 * | 5/2005 | Takahama et al. ................. 701/1 |
| 2005/0104879 | A1 * | 5/2005 | Kaye et al. .................... 345/419 |
| 2006/0192660 | A1 * | 8/2006 | Watanabe et al. ............. 340/435 |
| 2007/0085901 | A1 * | 4/2007 | Yang et al. ...................... 348/47 |
| 2008/0002027 | A1 * | 1/2008 | Kondo et al. ................. 348/148 |

FOREIGN PATENT DOCUMENTS

| JP | 07-186833 | 7/1995 |
| JP | 08-305999 | 11/1996 |
| JP | 2002-019556 | 7/2000 |
| JP | 2001-114047 | 4/2001 |
| JP | 2004040523 A * | 2/2004 |
| JP | 2004-213489 | 7/2004 |
| JP | 2005005978 A * | 1/2005 |
| JP | 2006-027556 | 2/2006 |
| JP | 2006-333009 | 7/2006 |
| JP | 2006-253872 | 9/2006 |
| JP | 2007-028363 | 2/2007 |

OTHER PUBLICATIONS

Notification of Reasons for Refusal for Japanese Patent Application No. 2007-040765 dated Aug. 8, 2011, 10 pgs.

* cited by examiner

*Primary Examiner* — Wing F Chan
*Assistant Examiner* — Kostas Katsikis
(74) *Attorney, Agent, or Firm* — Brinks Hofer Gilson & Lione

(57) ABSTRACT

The present invention provides an image processing device capable of enabling accurate recognition of a solid object present near a vehicle and displaying the solid object. The image processing device includes a viewpoint conversion unit for receiving data of images captured by at least one image capturing camera and generating a top view image, a solid object extraction unit for detecting a solid object from the data of the images captured by the at least one image capturing camera and extracting the solid object, a solid object image generation unit for generating a solid object image in accordance with the solid object extracted by the solid object extraction unit, and an image synthesis unit for synthesizing the solid object image generated by the solid object image generation unit with the top view image generated by the viewpoint conversion unit.

15 Claims, 10 Drawing Sheets

θ1 - θ4 : 160° OR GREATER

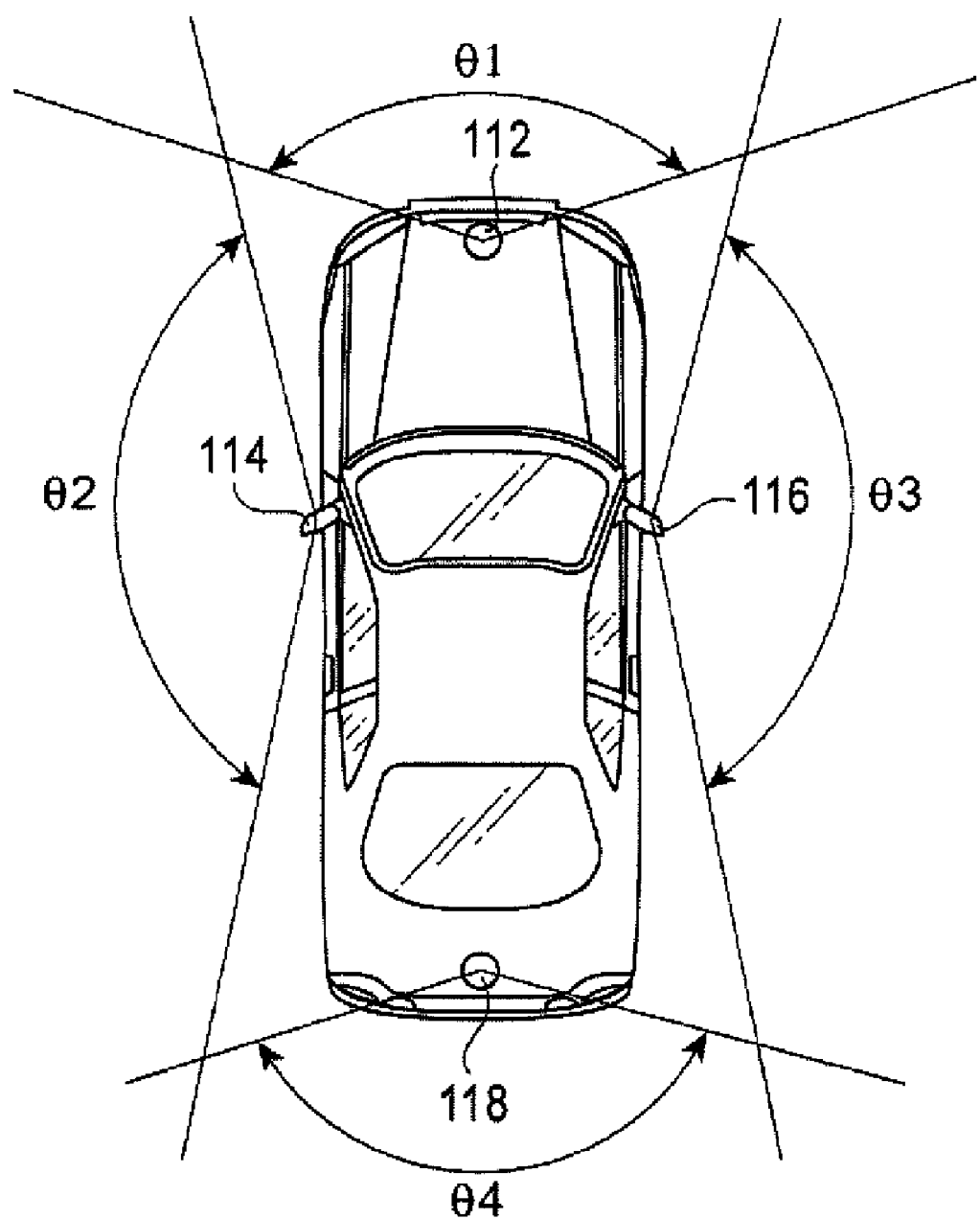

IMAGE PROCESSING DEVICE

RELATED APPLICATIONS

The present application claims priority to Japanese Patent Application Number 2007-040765, filed Feb. 21, 2007, the entirety of which is hereby incorporated by reference.

BACKGROUND OF THE INVENTION

1. Field of the Invention

The present invention relates to an image processing device for displaying an image of the surroundings of a vehicle captured by at least one image capturing camera mounted on the vehicle, and particularly to a technique of converting captured images into an image looking down from a point of view above the vehicle and displaying the converted image.

2. Description of the Related Art

Along with an increase in the use of image capturing cameras mounted on automobiles, applications using captured image data have been increasing. Many of such applications are for assisting a driver in driving and for improving the safety of a vehicle in driving and parking of the vehicle. For example, in a system which captures an image of an obstacle present near a vehicle and displays the captured image, images of the surroundings of the vehicle are captured by a plurality of super wide-angle image capturing cameras, and image data of the captured images are synthesized to display a 360° image of the surroundings of the vehicle. In this process, the data of the captured images can also be converted into an image looking down from a point of view above the vehicle (hereinafter referred to as a top view image) and can be displayed on a display.

Japanese Unexamined Patent Application Publication No. 2006-27556 discloses a technique of changing a method of outputting an image of the surroundings of a vehicle in accordance with the presence or absence of an obstacle near the vehicle. When the gear shift position is in reverse, an overhead image is displayed. In this process, a distance sensor determines whether or not an obstacle is present near the vehicle. If the presence of an obstacle is determined, the display is switched to a captured image directed in a direction showing the obstacle.

Japanese Unexamined Patent Application Publication No. 2002-19556 relates to a monitoring system for monitoring the surroundings of a vehicle. In the generation of a top view image, the image of an object becomes unclear in areas in which the ranges of the fields of vision of a plurality of cameras overlap. Therefore, images showing the overlapping areas are not synthesized but are individually displayed in an exception mode.

FIG. 1 is a conceptual diagram for explaining a method of generating a top view image performed by an image processing device. An image capturing camera 12 installed at a side-view mirror of a vehicle 10 captures an image of the left side of the vehicle 10, and outputs data of the captured image. A top view image displaying the surroundings of the vehicle is generated on the basis of the ground of the surroundings of the vehicle shown by the data of the captured image, and shows a display area 14. If the display area 14 includes a columnar solid object 16, for example, the solid object 16 is shown in the top view image as a solid object display 18 extending from the direction of the image capturing camera 12 to the direction of the ground and having a widened upper portion. Further, because the top view image is generated on the basis of the ground of the surroundings of the vehicle, the top view image cannot always accurately display the entire image of the solid object 16. Therefore, the solid object 16 may be displayed with an upper portion thereof widened, or the upper portion of the solid object 16 may not be displayed.

FIGS. 2A and 2B are diagrams illustrating the relationship between a side view image and the top view image. The side view image is an image captured by an image capturing camera installed at a side-view mirror as illustrated in FIG. 1. When the top view image is generated by performing viewpoint conversion on data of captured images of the front side, the rear side, and the lateral sides of a vehicle, a solid object disappears or is displayed in a distorted form in joined portions of the respective images. Further, for example, a side view image 20 of FIG. 2A which captures the image of a lateral side of the vehicle clearly shows a human FIG. 22. Meanwhile, a top view image 24 of FIG. 2B displays only a part of the human FIG. 22 due to the range of a screen to be displayed and the influence of a joined portion 26. Furthermore, although a human FIG. 23 appearing in FIG. 2A is shown in an edge region of the top view image 24, the human FIG. 23 may be displayed with an upper portion thereof widened or the upper portion of the solid object may not be displayed in the top view image 24 of FIG. 2B due to the limitation of the display range of the image. As a result, a user cannot accurately identify from the top view image the solid object present near the vehicle. Thus, it is difficult to use the top view image for parking assistance and so forth.

SUMMARY OF THE INVENTION

The present invention has been made in view of the above circumstances, and it is an object of the present invention to provide an image processing device capable of enabling accurate recognition of a solid object present near a vehicle and displaying the solid object.

Further, the present invention provides a navigation system capable of assisting driving by displaying data of captured images.

An image processing device according to one embodiment of the present invention is for displaying on a display an image of the surroundings of a vehicle. The image processing device includes at least one image capturing camera for capturing images of the surroundings of the vehicle and outputting data of the captured images, a viewpoint conversion unit for performing viewpoint conversion on the data of the captured images to convert the data into an image looking down from a point of view above the vehicle, a solid object extraction unit for extracting a solid object which has a relative speed with respect to the vehicle included in the data of the captured images or with respect to a surrounding environment, a solid object image generation unit for generating a solid object image in accordance with the extracted solid object, an image synthesis unit for synthesizing the generated solid object image with the image viewpoint-converted image, and a display control unit for displaying on the display the image synthesized by the image synthesis unit.

Preferably, the solid object extraction unit may extract the outline of the solid object, and the solid object image generation unit may generate the solid object image in accordance with the extracted outline of the solid object. Further, the solid object extraction unit may extract the moving direction of the solid object, and the solid object image generation unit may generate the solid object image in accordance with the extracted moving direction of the solid object. Furthermore, the solid object image generation unit may generate any one of a solid object image directly showing the extracted solid object, a solid object image emphasizing the outline of the solid object, and a solid object image with a shadow. Preferably, the image synthesis unit may change the color of the solid object image to distinguish it from the color of a surrounding image, and a color having a large contrast difference from the color of the surrounding image may be selected as the color of the solid object image.

Preferably, the solid object extraction unit may detect the solid object by using the principle of stereo vision, or may extract information of the outline and the moving direction of the solid object by using an inter-frame difference method or an optical flow. Preferably, the image synthesis unit may determine the direction and the size of the solid object image in accordance with at least one of the moving direction, the size, and the distance from the vehicle of the solid object extracted by the solid object extraction unit. Further, the image synthesis unit may determine a synthesis position of the solid object image on the basis of the display of a particular solid object included in the viewpoint-converted image. Furthermore, the at least one image capturing camera may include a plurality of image capturing cameras for capturing images of the front side, the rear side, and the lateral sides of the vehicle, and the data of the captured images may be subjected to the viewpoint conversion to display an omnidirectional image centering on the vehicle.

An image processing program according to one embodiment of the present invention is for displaying on a display an image of the surroundings of a vehicle. The image processing program includes a step of capturing images of the surroundings of the vehicle and extracting a solid object which has a relative speed with respect to the vehicle included in data of the captured images or with respect to a surrounding environment, a step of generating a solid object image in accordance with the extracted solid object, a step of performing viewpoint conversion on the data of the captured images to convert the data into an image looking down from a point of view above the vehicle, a step of synthesizing the solid object image with the viewpoint-converted image, and a step of displaying the synthesized image on the display.

According to one aspect, even if the solid object can disappear or be deformed due to the influence of the joined portions of the viewpoint-converted image or due to the limitation of the display range of the viewpoint-converted image, the solid object image is generated in accordance with the solid object extracted from the data of the captured images, and the generated solid object image is synthesized with the viewpoint-converted image. Accordingly, it is possible to accurately inform a user of the presence of the solid object present near the vehicle, and thus to provide highly safe driving assistance with the use of the data of the captured images.

BRIEF DESCRIPTION OF THE DRAWINGS

FIG. 4 is a plan view illustrating an arrangement of image capturing cameras installed on a vehicle;

DESCRIPTION OF THE PREFERRED EMBODIMENTS

Preferred embodiments of the present invention will be described in detail below with reference to the drawings.

Figure 1:
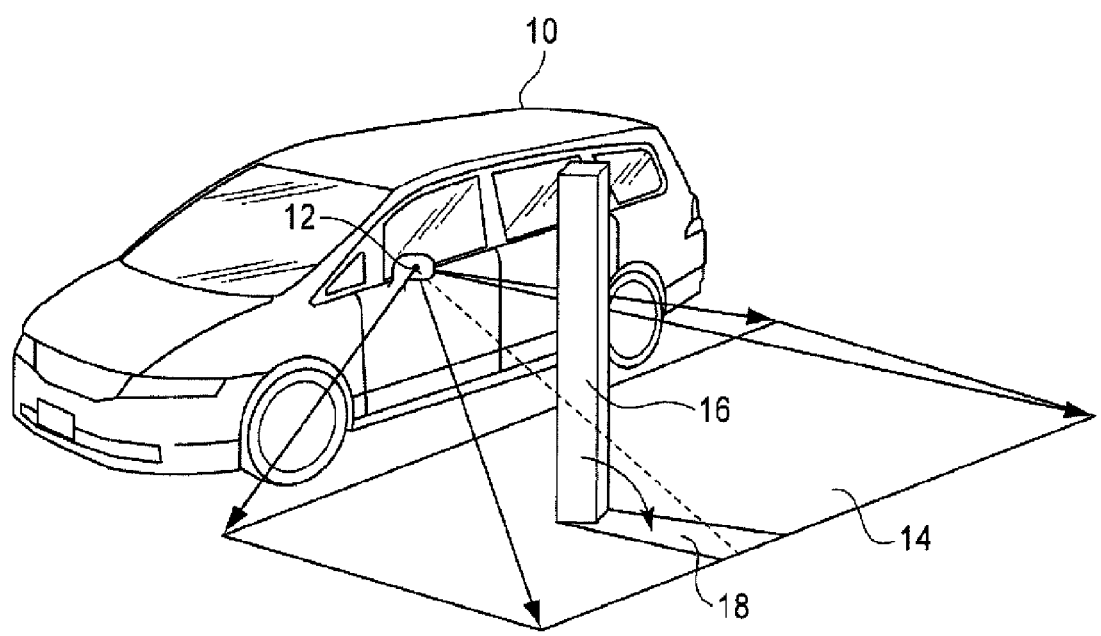
FIG. 1 is a conceptual diagram for explaining a method of generating a top view image.
Figure 2A:
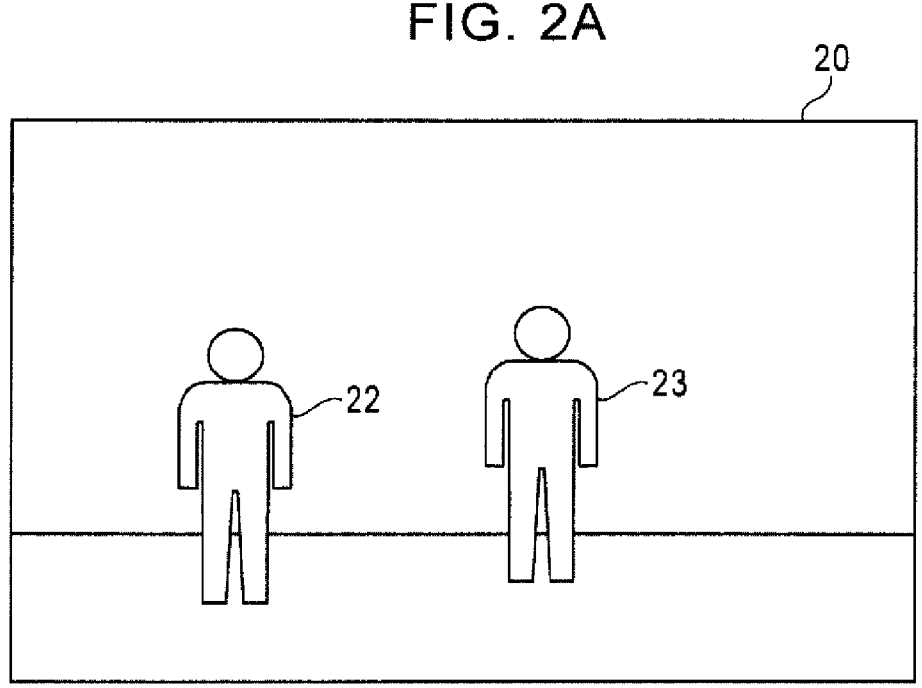
FIGS. 2A and 2B are diagrams illustrating the relationship between a side view image and the top view image, with FIG. 2A illustrating the side view image and FIG. 2B illustrating the top view image.
Figure 2B:
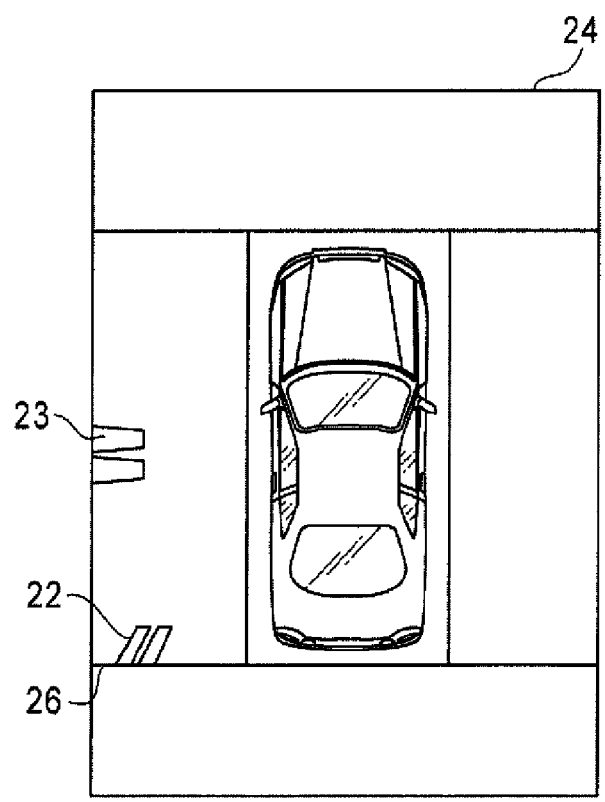
Figure 3A:
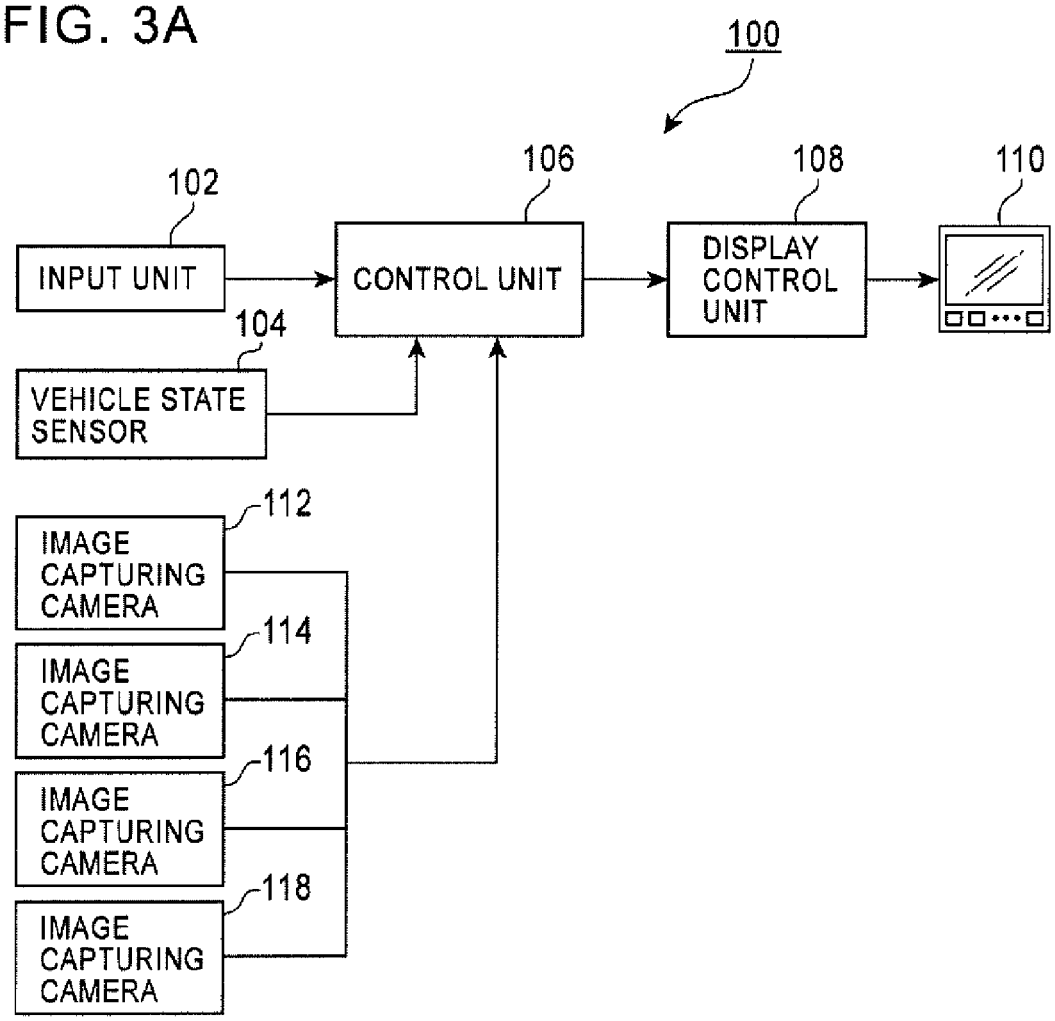
FIG. 3A is a block diagram illustrating a configuration of an image processing device according to an embodiment of the present invention.

FIG. 3A is a block diagram illustrating a configuration of an image processing device 100 according to an embodiment of the present invention. The image processing device 100 is configured to include an input unit 102 to which a user inputs an instruction, a vehicle state sensor 104 for outputting a state of a vehicle, such as the speed and the gear shift position of the vehicle, a control unit 106 for controlling respective units in accordance with an image processing program, a display control unit 108 for displaying a top view image on a display 110, and image capturing cameras 112 to 118 for capturing images of the surroundings of the vehicle.

Figure 3B:
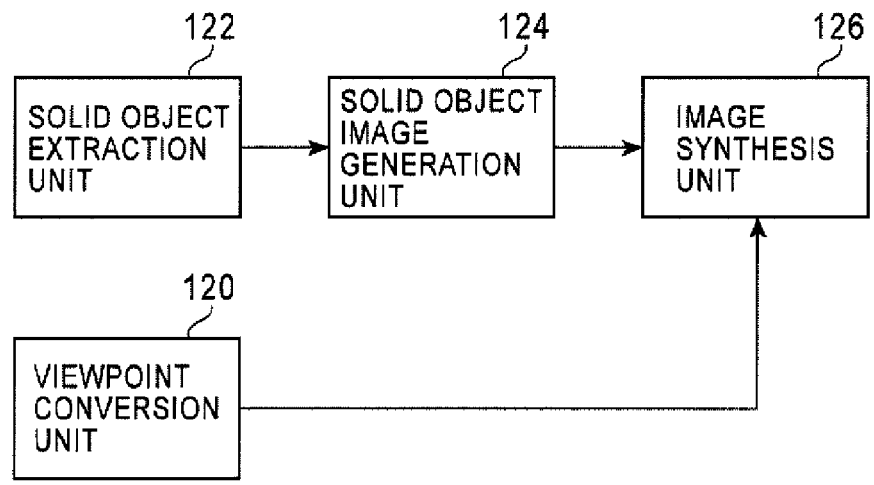
FIG. 3B is a block diagram illustrating, in one embodiment, a functional configuration of a control unit, and illustrating a hardware block diagram in another embodiment.

FIG. 3B is a block diagram illustrating a functional configuration of the control unit 106, and may also represent a hardware block diagram configuration. The control unit 106 includes a viewpoint conversion unit 120, a solid object extraction unit 122, a solid object image generation unit 124, and an image synthesis unit 126. The viewpoint conversion unit 120 receives data of the images captured by the image capturing cameras 112 to 118, and generates a top view image looking down from above the vehicle. The solid object extraction unit 122 detects a moving solid object included in the data of the images captured by the image capturing cameras 112 to 118, i.e., a solid object having a relative speed with respect to the vehicle or with respect to a surrounding environment, and extracts the detected solid object. The solid object image generation unit 124 generates a solid object image in accordance with the solid object extracted by the solid object extraction unit 122. The image synthesis unit 126 synthesizes the solid object image generated by the solid object image generation unit 124 with the top view image generated by the viewpoint conversion unit 120.

Each of the image capturing cameras 112 to 118 is configured to include an optical system which includes, for example, a Charge-Coupled Device (CCD) image pickup device and a fisheye lens having a viewing angle of 160° or greater. As illustrated in FIG. 4, the image capturing camera 112 is attached to a bumper on the front side of the vehicle, for example, to capture an image of the front side of the vehicle with a viewing angle of $\theta 1$. The image capturing cameras 114 and 116 are attached to side-view mirrors of the vehicle, for example, to capture therefrom images of the lateral sides of the vehicle with viewing angles of $\theta 2$ and $\theta 3$, respectively. The image capturing camera 118 is attached in the vicinity of a bumper license plate on the rear side of the vehicle, for example, to capture an image of the rear side of the vehicle with a viewing angle of θ4. Each of the viewing angles θ1, θ2, θ3, and θ4 of the image capturing cameras 112 to 118 overlaps with adjacent viewing angles in edge portions thereof. Thus, the images of the entire surroundings of the vehicle can be captured by the image capturing cameras 112 to 118. In the present embodiment, the images of the surroundings of the vehicle are captured by four image capturing cameras. However, the invention is not limited to the above. For example, the images may be captured by a larger number of image capturing cameras. Further, the attachment positions of the image capturing cameras are not necessarily limited to the bumpers and the side-view mirrors.

The control unit 106 preferably includes a memory, such as a Read-Only Memory (ROM) and a Random Access Memory (RAM), and the memory stores the image processing program. To display the top view image in accordance with the image processing program, the control unit 106 synthesizes the solid object image generated by the solid object image generation unit 124 with the top view image.

Figure 5:
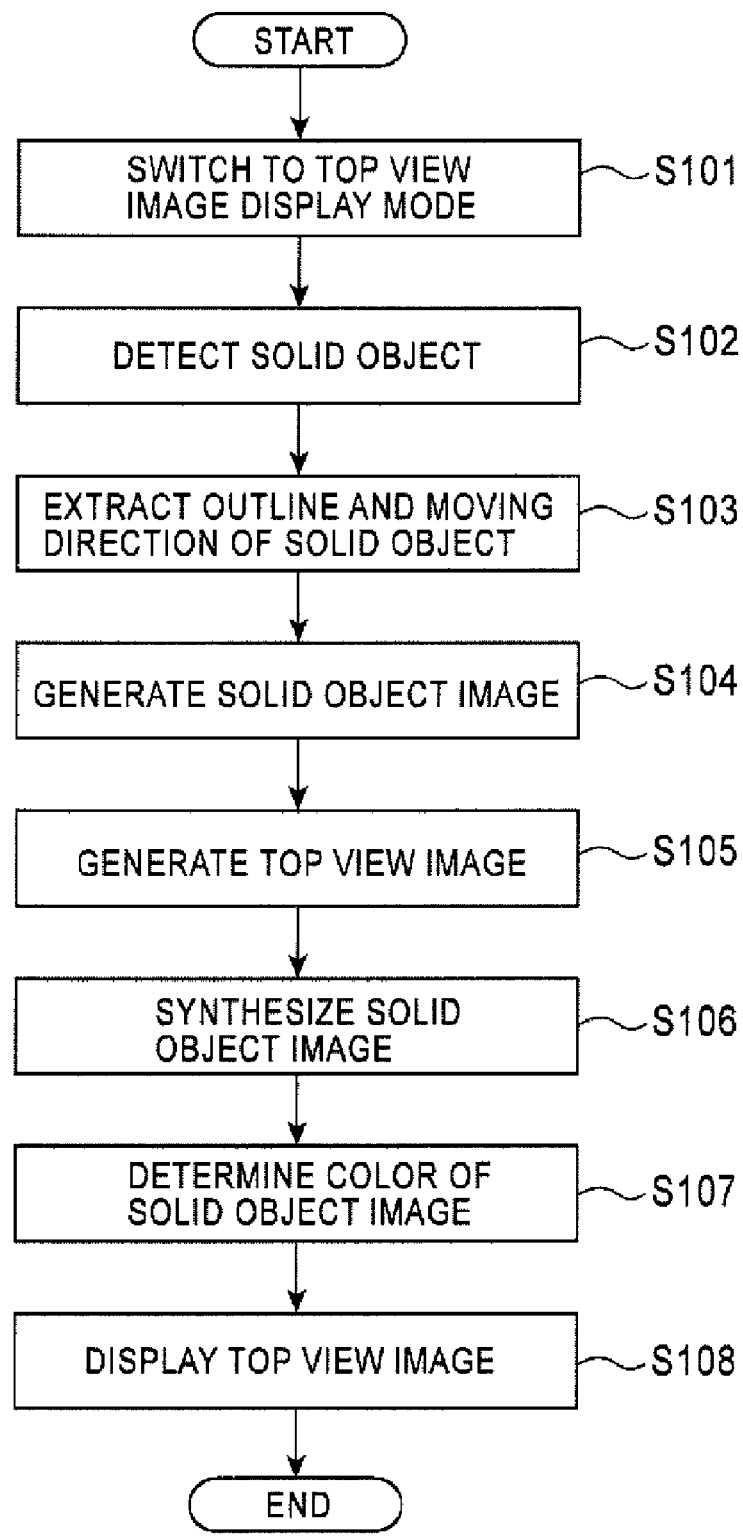
FIG. 5 is a flowchart for explaining a top view image display operation by the image processing device according to the embodiment of the present invention.

With reference to the flowchart of FIG. 5, description will now be made of an operation by the image processing device 100 of displaying the top view image. First, the control unit 106 monitors the output from the vehicle state sensor 104, and switches the display mode to a top view image display mode when the vehicle moves back or slows down to or below a predetermined speed (Step S101).

The solid object extraction unit 122 receives the data of the images captured by the image capturing cameras 112 to 118, and detects a solid object from the data of the captured images (Step S102). If there is relative movement between the vehicle and the solid object present near the vehicle, the solid object extraction unit 122 can detect the solid object by using the principle of stereo vision with two image capturing cameras. Even with a single image capturing camera, if there is movement by the solid object or the vehicle, the solid object extraction unit 122 can detect the solid object by a single stereo measurement method which uses images having a time difference. Further, if the vehicle and the solid object are stationary, or if the detection of the solid object by two image capturing cameras is difficult, the solid object extraction unit 122 can use in combination an ultrasonic sensor, a millimeter wave sensor, or the like to detect the moving solid object included in the data of the captured images.

Then, the solid object extraction unit 122 extracts the detected solid object. The solid object extraction unit 122 may extract the entire solid object, but preferably extracts the outline and the moving direction of the solid object (Step S103). The outline and the moving direction of the solid object can be extracted by performing an inter-frame difference method on the data of the captured images.

Figure 6A:
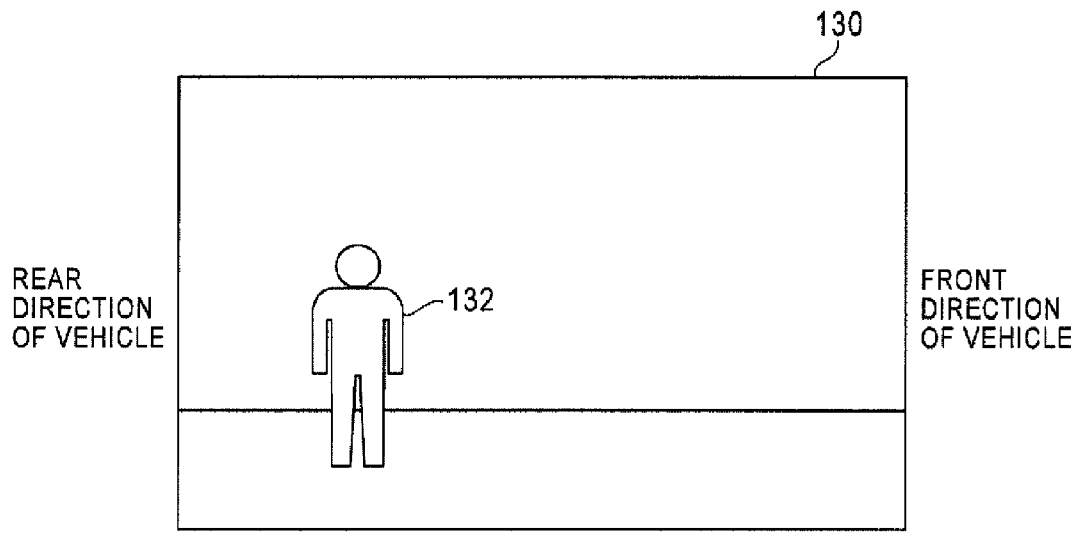
FIGS. 6A and 6B are diagrams illustrating data of captured images of a lateral side of the vehicle, with FIG. 6A illustrating a frame obtained at t seconds, and FIG. 6B illustrating a frame obtained after the elapse of $\Delta t$ seconds since t seconds.
Figure 6B:
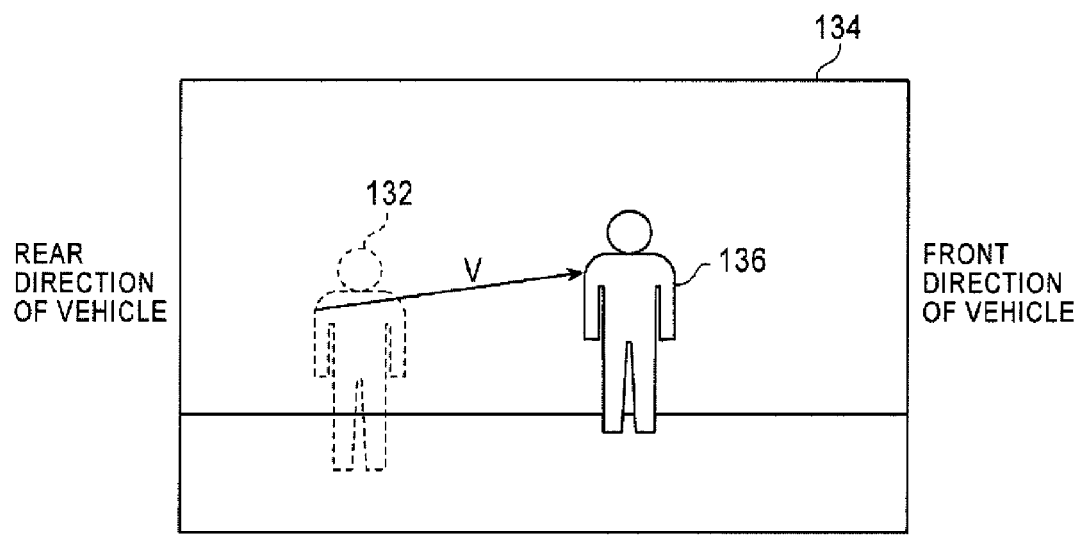

FIGS. 6A and 6B illustrate data of an image of the left side of the vehicle captured by the image capturing camera 114. FIG. 6A illustrates frame data obtained at a time of t seconds, while FIG. 6B illustrates frame data obtained after the elapse of Δ (delta) t seconds since t seconds. The frame data 130 illustrated in FIG. 6A shows a human FIG. 132, for example, while the frame data 134 illustrated in FIG. 6B shows a human FIG. 136 obtained after Δt seconds. When the human FIG. 132 displayed in the frame data 130 is detected as a solid object, the solid object extraction unit 122 can extract the outline of the human FIG. 132 and also extract a movement vector V of the human FIG. 136 from the difference between the two sets of frame data 132 and 134.

Figure 7:
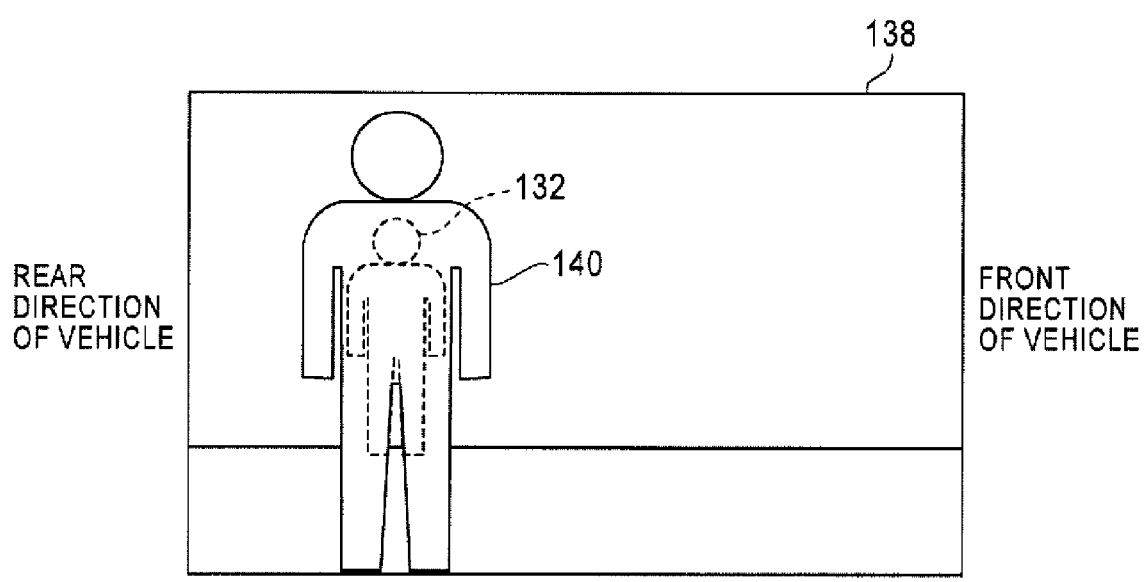
FIG. 7 is a diagram illustrating a frame obtained after the elapse of $\Delta t$ seconds.

Further, as illustrated in FIG. 7, if the image of a human FIG. 140 shown in frame data 138 obtained after Δt seconds is captured as an enlarged image as compared with the human FIG. 132 obtained at the time of t seconds, the movement of the person toward the near side (i.e., toward the vehicle) is extracted. The method of extracting the outline and the moving direction of the solid object is not limited to the inter-frame difference method, but may be an optical flow. The optical flow, which is a type of image processing, is a method of associating the same objects between two images shot at different times and expressing the moving distance of the object in vector data.

Then, the solid object image generation unit 124 generates a solid object image in accordance with the solid object extracted by the solid object extraction unit 122 (Step S104). The solid object image generation unit 124 can generate a solid object image directly showing the extracted solid object, a solid object image emphasizing the outline of the solid object, or a solid object image showing the shadow of the solid object. The position of the shadow is determined in accordance with the moving direction of the solid object. For example, the shadow can be formed at a predetermined angle in the opposite direction to the moving direction of the solid object. The solid object image generated by the solid object image generation unit 124 is provided to the image synthesis unit 126 together with the moving direction of the solid object.

Meanwhile, the data of the images captured by the image capturing cameras 112 to 118 is provided to the viewpoint conversion unit 120. Then, the viewpoint conversion unit 120 performs the viewpoint conversion on the received data of the captured images and combines the viewpoint-converted captured images, to thereby form a top view image (Step S105).

The respective sets of data of the captured images include mutually overlapping regions and regions not to be used in the top view image. Therefore, the viewpoint conversion unit 120 performs viewpoint conversion correction on the respective sets of data of the captured images to create images looking down from above the vehicle, cuts out of the respective viewpoint-converted images regions to be used in the top view, and combines the cut-out regions. The viewpoint conversion unit 120 provides the generated top view image to the image synthesis unit 126.

Then, the image synthesis unit 126 synthesizes the solid object image received from the solid object image generation unit 124 with the top view image received from the viewpoint conversion unit 120 (Step S1106). The position at which the solid object image is synthesized is adjusted to the position at which the solid object is included in the data of the captured images. Further, the image synthesis unit 126 determines the direction and the size of the solid object image in accordance with the moving distance, the size, or the distance from the vehicle of the solid object.

Then, the image synthesis unit 126 determines the color of the solid object image (Step S107). Preferably, the image synthesis unit 126 selects a color distinguishable from the color of the surrounding image or a color having a large contrast difference from the color of the surroundings, and assigns the selected color to the solid object image. The image synthesis unit 126 determines the color of the solid object image by selecting a color having the largest contrast difference from the color of the surroundings out of a plurality of previously prepared colors of blue, yellow, red, and so forth, for example. Finally, via the display control unit 108, the control unit 106 displays on the display 110 the top view image synthesized with the solid object image by the image synthesis unit 126 (Step S108).

Figure 8A:
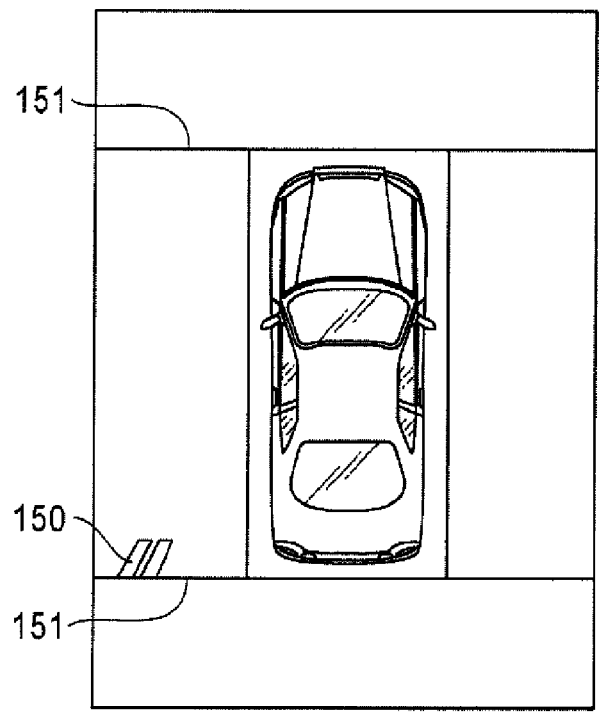
FIGS. 8A and 8B are diagrams illustrating an example of the synthesis of a solid object image, with FIG. 5A illustrating a top view image before the synthesis, and FIG. 8B illustrating a top view image after the synthesis.
Figure 8B:
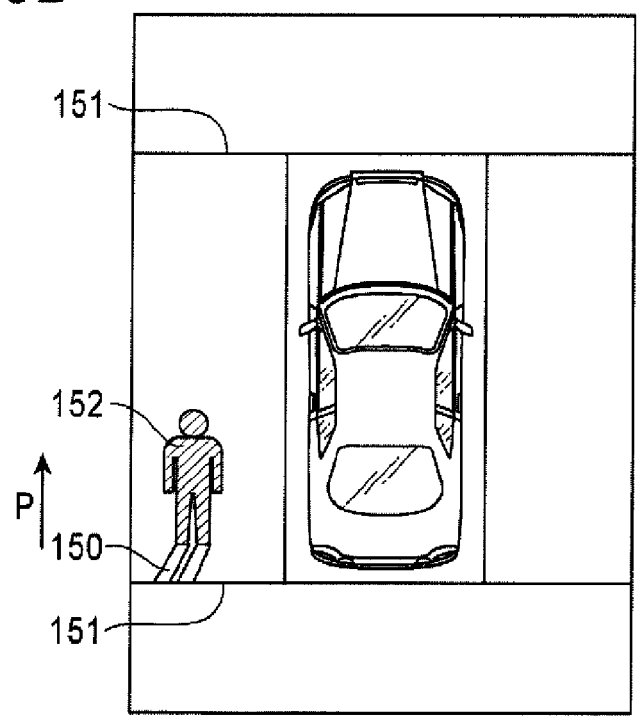

FIGS. 8A and 8B are diagrams illustrating an example of the synthesis of a solid object image. FIG. 8A illustrates a top view image before the synthesis of the solid object image, while FIG. 8B illustrates a top view image after the synthesis of the solid object image. If the top view image as illustrated in FIG. 5A includes a solid object display 150 in a joined portion 151 of images, the image synthesis unit 126 synthesizes a solid object image 152 such that the position of the synthesized solid object image corresponds to the position of the solid object display 150, as illustrated in FIG. 5B. Preferably, the solid object image 152 is synthesized so as to be connected to the solid object display 150, or is synthesized on the solid object display 150 to overwrite the solid object display 150. With this configuration, even if a part of the solid object display 150 disappears or is deformed in the joined portion 151 of images, as illustrated in FIG. 8A, an accurate outline of the solid object display 150 can be shown by the solid object image 152, as illustrated in FIG. 8B.

Further, the image synthesis unit 126 may change the direction of the solid object image 152 in accordance with the moving direction of the solid object. For example, if the moving direction P of the solid object display 150 is parallel to the direction of the vehicle, a shadow may be displayed which is formed when light is applied to the solid object from a position approximately 60° above the solid object in the opposite direction to the moving direction. Further, the image synthesis unit 126 can adjust the size of the solid object image 152 to fit the top view image.

Figure 9A:
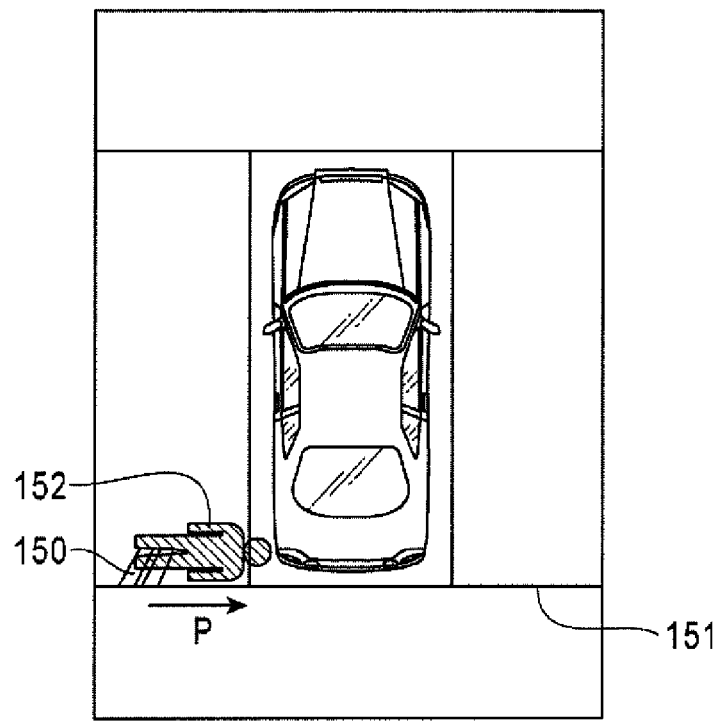
FIGS. 9A and 9B are diagrams illustrating other examples of the synthesis.
Figure 9B:
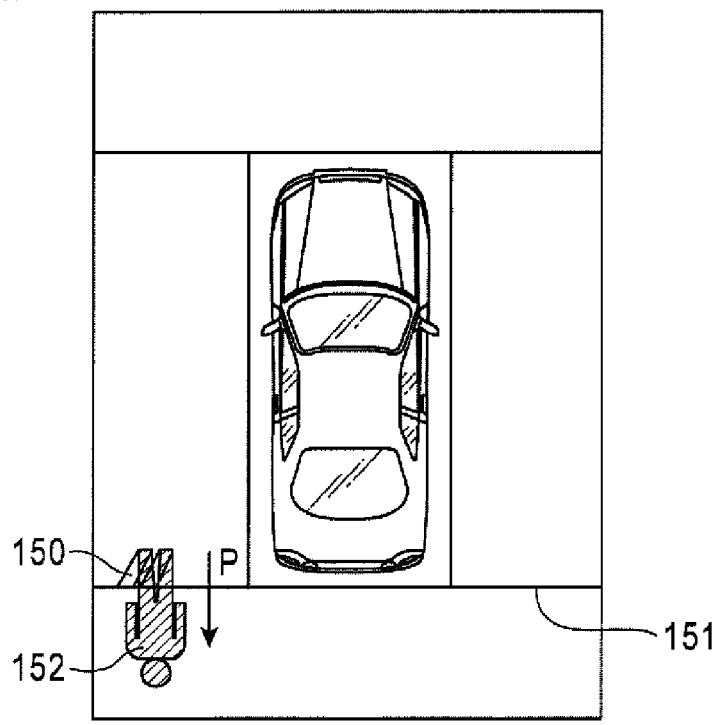

FIGS. 9A and 9B are diagrams illustrating other examples of the synthesis in accordance with the moving direction. If the solid object is moving toward the vehicle, for example, the solid object display 152 is synthesized in the direction as illustrated in FIG. 9A, in accordance with the moving direction of the solid object. Similarly, if the solid object is moving toward the rear side of the vehicle, the solid object display 152 is synthesized in the direction as illustrated in FIG. 9B.

In the image processing device according to the present embodiment, the solid object image is synthesized with the top view image to enable the user to accurately recognize the solid object in the joined portions of the top view image. In some cases, an image behind the solid object image is hidden due to the synthesis of the solid object image. If the hidden image is necessary information for the user, the solid object image may be translucently displayed. Alternatively, only the outline of the solid object image may be displayed, with the inner portion of the solid object image made transparent. For example, the user can operate the input unit 102 and select the color of the solid object image to be translucent so as to check the image hidden by the solid object image.

Further, in the present embodiment, the image processing program is started in accordance with the output from the vehicle state sensor 104. However, the invention is not limited to the above. For example, the image processing program may be started in accordance with an input operation by the user.

Figure 10:
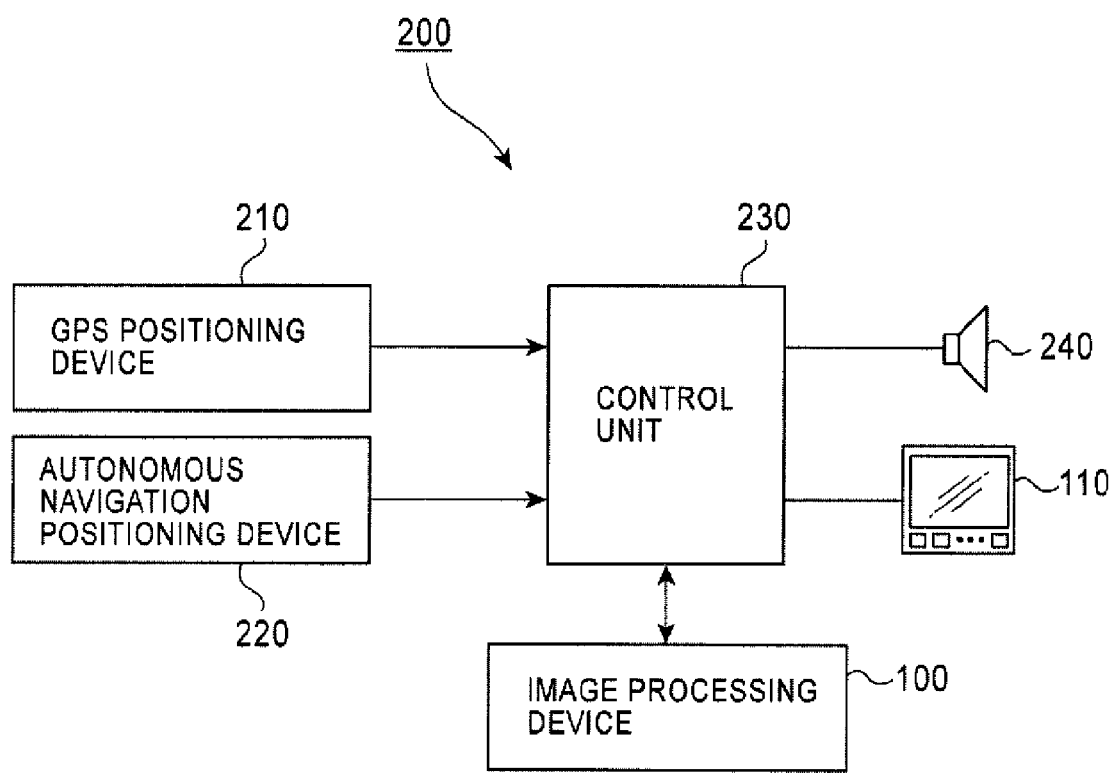
FIG. 10 is a diagram illustrating a navigation system using the image processing device according to an embodiment of the present invention.

FIG. 10 is a diagram illustrating a navigation system using the image processing device according to the present embodiment. The navigation system 200 includes a Global Positioning System (GPS) positioning device 210, an autonomous navigation positioning device 220, a control unit 230 for displaying on the display 110 a road map showing the surroundings of the position of a vehicle on the basis of positional information transmitted from the positioning devices and for searching for a route to a destination, a speaker 240, and the image processing device 100 according to the present embodiment.

When the vehicle is running at a predetermined speed or more, the control unit 230 displays on the display 110 the road map showing the surroundings of the position of the vehicle.

Meanwhile, if the destination is a parking lot, and if the vehicle is approaching the parking lot, for example, the control unit 230 switches the display mode to the top view image display mode to display the top view image on the display 110 for assisting the user in parking the vehicle.

Switching to the top view image display mode can be automatically performed by determining, for example, the stopping or starting of the vehicle or the parking of the vehicle in a parking lot. Alternatively, switching may be performed in accordance with an input by the user.

The image processing device according to the present invention can be used as a parking assistance system used in a parking operation of a vehicle. As a type of use of the image processing device, the device can be functionally connected to a navigation device or another electronic device such as a computer.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An image processing device configured to display on a display screen, an image of corresponding surroundings of a vehicle, wherein the image processing device comprises:
   at least one image capturing camera, wherein each corresponding one image capturing cameras captures images of the corresponding surroundings of the vehicle and generates a corresponding plurality of frames of image data belonging to the corresponding one image capturing camera;
   a control unit;
   a viewpoint converter, in the control unit, configured to perform viewpoint conversion on the image data to generate a viewpoint-converted image belonging to the corresponding one image capturing camera having a point of view looking downwardly from above the vehicle;
   a solid object extractor, in the control unit, configured to extract an outline of a solid object belonging to the corresponding one image capturing camera based on inter-frame differences from the corresponding frames of image data when there is relative motion between the vehicle and the solid object, wherein the solid object extractor further extracts at least one of a moving direction, a size, and a distance from the vehicle to the solid object;
   a solid object image generator, in the control unit, configured to generate a solid object image belonging to the corresponding one image capturing camera based on the extracted outline of the solid object, wherein the solid object image generator generates the solid object image in accordance with at least one of the extracted moving direction, the size, and the distance from the vehicle to the solid object;
   an image synthesizer, in the control unit, configured to synthesize a display image belonging to the corresponding one image capturing camera based on the generated solid object image and the viewpoint-converted image, wherein the image synthesizer determines the direction and the size of the solid object image in accordance with at least one of the moving direction, the size, and the distance from the vehicle to the solid object extracted by the solid object extractor; and a display controller, coupled to the control unit, configured to display on the display screen at least the display image belonging to the corresponding one image capturing camera synthesized by the image synthesizer.

2. The image processing device according to claim 1, wherein the solid object image generator generates one of a solid object image directly showing the extracted solid object, a solid object image emphasizing the outline of the solid object, and a solid object image with a shadow.

3. The image processing device according to claim 1, wherein the image synthesizer determines a synthesis position of the solid object image on the basis of a particular solid object included in the viewpoint-converted image.

4. The image processing device according to claim 1, wherein the at least one image capturing camera includes a plurality of image capturing cameras which captures images of a front side, a rear side, and lateral sides of the vehicle.

5. The image processing device according to claim 1, wherein the image synthesizer determines the color of the solid object image to distinguish the color from the color of a surrounding image.

6. The image processing device according to claim 5, wherein a color having a large contrast difference from the color of the surrounding image is determined as the color of the solid object image.

7. A navigation system, which comprises:
a navigation device;
a control unit; and
an image processing device which displays on a display screen an image of surroundings of a vehicle, the image processing device comprises:
at least one image capturing camera wherein each corresponding one image capturing cameras captures images of the corresponding surroundings of the vehicle and generates a plurality of frames of image data corresponding to the captured images belonging to the corresponding one image capturing camera,
a viewpoint converter, in the control unit, configured to perform viewpoint conversion on the image data to generate a viewpoint-converted image belonging to the corresponding one image capturing camera having a point of view looking downwardly from above the vehicle,
a solid object extractor, in the control unit, configured to extract an outline of a solid object belonging to the corresponding one image capturing camera based on inter-frame differences from the corresponding frames of image data when there is relative motion between the vehicle and the solid object, wherein the solid object extractor further extracts at least one of a moving direction, a size, and a distance from the vehicle to the solid object;
a solid object image generator, in the control unit, configured to generate a solid object image belonging to the corresponding one image capturing camera based on the extracted outline of the solid object, wherein the solid object image generator generates the solid object image in accordance with at least one of the extracted moving direction, the size, and the distance from the vehicle to the solid object,
an image synthesizer, in the control unit, configured to synthesize a display image belonging to the corresponding one image capturing camera based on the generated solid object image and the viewpoint-converted image, wherein the image synthesizer determines the direction and the size of the solid object image in accordance with at least one of the moving direction, the size, and the distance from the vehicle to the solid object extracted by the solid object extractor and a display controller configured to display on the display screen at least the display image belonging to the corresponding one image capturing camera synthesized by the image synthesizer.

8. The navigation system according to claim 7,
wherein the navigation device includes a control unit that determines at least one of: whether or not the vehicle is stopped and whether or not the vehicle is running at a predetermined low speed, and
wherein the display controller displays the synthesized image when the control unit determines that the vehicle is stopped or running at the low speed.

9. A non-transitory computer readable medium storing an image processing program which causes at least an image processing device performing image processing functions comprising displaying on a display an image of surroundings of a vehicle, wherein the image processing functions comprising:
capturing images of the surroundings of the vehicle belonging to a corresponding one image capturing camera and extracting a solid object which has a relative speed with respect to the vehicle included in data of the captured images or with respect to a surrounding environment, and further including extracting at least one of a moving direction, a size, and a distance from the vehicle to the solid object;
generating a solid object image belonging to the corresponding one image capturing camera in accordance with the extracted solid object, and further including generating the solid object image in accordance with the extracted moving direction, size, and distance from the vehicle to the solid object;
performing viewpoint conversion on the data of the captured images belonging to the corresponding one image capturing camera to convert the data into an image looking down from a point of view above the vehicle;
synthesizing the solid object image with the viewpoint-converted image, and further including determining a direction of the solid object image in accordance with the extracted moving direction of the solid object; and
displaying at least the synthesized image belonging to the corresponding one image capturing camera on the display.

10. The non-transitory computer readable medium according to claim 9,
wherein the extracting includes extracting the outline of the solid object, and
wherein the generating includes generating the solid object image in accordance with the extracted outline of the solid object.

11. The non-transitory computer readable medium according to claim 9,
wherein the generating includes generating one of a solid object image directly showing the extracted solid object, a solid object image emphasizing the outline of the solid object, and a solid object image with a shadow.

12. The non-transitory computer readable medium according to claim 9, wherein the synthesizing includes determining the color of the solid object image to distinguish the color from the color of a surrounding image.

13. The non-transitory computer readable medium according to claim 9, wherein the synthesizing includes determining a synthesis position of the solid object image on the basis of a particular solid object included in the viewpoint-converted image.

14. The non-transitory computer readable medium according to claim 9, wherein the viewpoint-converting includes performing the viewpoint conversion on the data of the captured images of a front side, a rear side, and lateral sides of the vehicle to generate omnidirectional data of the captured images centering on the vehicle.

15. An image display method configured to display on a display screen an image of surroundings of a vehicle, the image display method comprising:

capturing a plurality of images of the surroundings of the vehicle belonging to a corresponding one image capturing camera and extracting an outline of a solid object data of the captured images based on inter-frame differences;

generating a solid object image belonging to the corresponding one image capturing camera based on the extracted outline of the solid object based on inter-frame differences when there is relative motion between the vehicle and the solid object;

extracting at least one of a moving direction, a size, and a distance from the vehicle to the solid object and determining a moving direction of the solid object;

performing viewpoint conversion on the data of the at least one captured image to generate a viewpoint-converted image belonging to the corresponding one image capturing camera having a point of view looking downwardly from above the vehicle;

synthesizing a display image belonging to the corresponding one image capturing camera on the display based on the solid object image and the viewpoint-converted image; and displaying at least the synthesized display image on the display.

* * * * *